United States Patent [19]
Okey

[11] 3,969,758
[45] July 13, 1976

[54] SYNCHRONIZING SYSTEM FOR VIDEO RECORDERS

[75] Inventor: Bernard J. Okey, Sunnyvale, Calif.

[73] Assignee: BASF Aktiengesellschaft, Ludwigshafen (Rhine), Germany

[22] Filed: Oct. 4, 1974

[21] Appl. No.: 512,364

[52] U.S. Cl. .............................. 358/8; 178/69.5 G; 358/4; 358/17
[51] Int. Cl.$^2$ ..................... H04N 5/76; H04N 9/44; H04L 7/00
[58] Field of Search ................... 358/4, 8, 9, 14, 17, 358/18, 19, 20; 360/36, 37, 26; 178/6.6 TC, 69.5 CB, 69.5 G, 69.5 TV

[56] References Cited
UNITED STATES PATENTS

| | | | |
|---|---|---|---|
| 3,594,498 | 7/1971 | Smith | 358/8 |
| 3,624,281 | 11/1971 | Phan | 178/69.5 |
| 3,735,015 | 5/1973 | Mesak | 358/4 |
| 3,786,178 | 1/1974 | Scholz | 358/4 |
| 3,900,885 | 8/1975 | Tallent et al | 358/8 |

Primary Examiner—Robert L. Griffin
Assistant Examiner—R. John Godfrey

[57] ABSTRACT

A synchronizing scheme for use in color video recording systems which employs two voltage controlled oscillators, the first being phase locked to the color burst of the incoming video signal in recording, but operating as a freerunning oscillator on playback, and the second being locked to the horizontal sync of the incoming video signal in recording and of the jitter-affected off-tape video signal in playback. The first oscillator, through the medium of frequency dividers, generates the color subcarrier and supplies the motor and servo references to the recorder, and the second oscillator serves as a clock for a sync generator producing a sync pattern. This sync pattern is used for controlling the impressing of fresh sync information on the video signal in recording, and the reinsertion of the color burst in the off-tape signal in playback, and also for providing the trisequential driving pulses required by the trisequential color processing circuitry. The sync pattern is also used to drive and synchronize an external video source, for example, a camera.

12 Claims, 4 Drawing Figures

FIG. 1 COLOR PROCESSING CIRCUIT

RECORDER SYNC. CIRCUIT

SYNC GENERATOR OUTPUT WAVEFORMS
"Prior Art"

Separation of Color Burst

SYNCHRONIZING SYSTEM FOR VIDEO RECORDERS

The invention relates to synchronizing arrangements for video recorder systems, for example systems of this type employing "linear" magnetic tape recorders, and especially systems of the type just mentioned which permit line sequential color recording.

The invention lends itself particularly well for use in home entertainment systems, including such systems for home use which, in addition to a color television receiver and a tape recorder, also provide for a color video camera by means of which signals representing live scenes or the like may be picked up for transmission to the TV receiver for instantaneous display and to the tape recorder for recording and later playback; and it is also applicable to the recording and subsequent playback, for example with the aid of an auxiliary tape recorder, of editing information to be used in connection with recorded TV programs.

An important requirement in home entertainment systems is that the necessary synchronization of the various signals involved is brought about with a maximum of precision and a minimum of cost. Basically, the approach used by the arrangement according to the invention in attaining this objective, is that there is associated with the video recorder a single synchronizing circuit which is provided in common for off-air recording, for playback, and also for off-camera recording if used. This synchronizing circuit, more particularly, includes two oscillators of which, in the recording mode, one is phase locked to the color burst, and the other to the horizontal sync pulse of the incoming video signal. Derived from the first oscillator, for example through the medium of a frequency divider, is the unmodulated subcarrier serving for the phase locking of this oscillator to the color burst, and also the line frequency which is the motor reference employed in the drive control of the video recorder and which, accordingly, likewise locks the drive motor to the color burst. Derived from the second oscillator, through the medium of a sync generator, is a sync pattern which is used for synchronously controlling the impression, in the color processing circuitry, of fresh sync information on the video signal to be recorded. In the playback mode the first oscillator from which the unmodulated subcarrier is obtained, is free-running, and in this instance the subcarrier is reinserted, under the control of a pulse derived from the aforementioned sync generator, in the video signal to be displayed. Also, generated by the first oscillator with the aid of a frequency divider is the servo reference which, in effect, forces the off-tape video signal to have the corresponding horizontal sync frequency.

The invention is applicable with particular advantage to color video recording systems in which the incoming video information prior to recording is converted into line sequential form. A system of this type has been described for example in co-pending United States patent application Ser. No. 473,221, filed May 24, 1974 now U.S. Pat. No. 3,891,503 by Bernard J. Okey, one of the co-inventors of the present application, on Trisequential Video Record Playback Method and Circuits, to which reference is made herewith for purposes of more detailed disclosure. If the invention is used in conjunction with such a system, the trisequential pulses — each corresponding to one of the colors — which are required for the driving of the trisequential switch used in the system, can be obtained from the sequencer driven by an output, such as the horizontal drive pulse, of the sync generator, In this fashion the various components of the sync pattern with their respective synchronization functions are all locked, in recording, to the horizontal sync pulse of the incoming video signal, and the subcarrier and line frequencies generated by the synchronization circuitry are also locked, in recording, to the incoming video signal, namely through the medium of the color burst riding on the back porch of the signal.

In playback, the individual components of the sync pattern are all locked to the horizontal sync of the off-tape video signal, and hence they follow, as they should, the jitter content of the off-tape signal. Yet, inasmuch as the servo reference is derived from the same source—the free-running first oscillator—as the color sub-carrier, the sync pattern in effect is locked to this generated, and eventually reinserted, subcarrier. With the exception of the phase lock loop for the first oscillator, which is employed only in recording, the same synchronizing circuitry can be used in both recording and playback. Furthermore, as described in the above referenced copending application, many of the components of the trisequential conversion circuitry can be commonly used for both of these operating modes.

If the home entertainment system also includes a color video camera, the output pulses and frequencies generated by the synchronizing circuitry according to the invention, can be simultaneously used for driving such a camera. As a result, virtually no synchronizing equipment needs to be included in the camera, and the cost of the camera therefore can be substantially reduced.

An embodiment of the invention will be described hereinafter with reference to the accompanying drawings, in which.

THE APPARATUS USED IN THE SYSTEM

Figure 1:
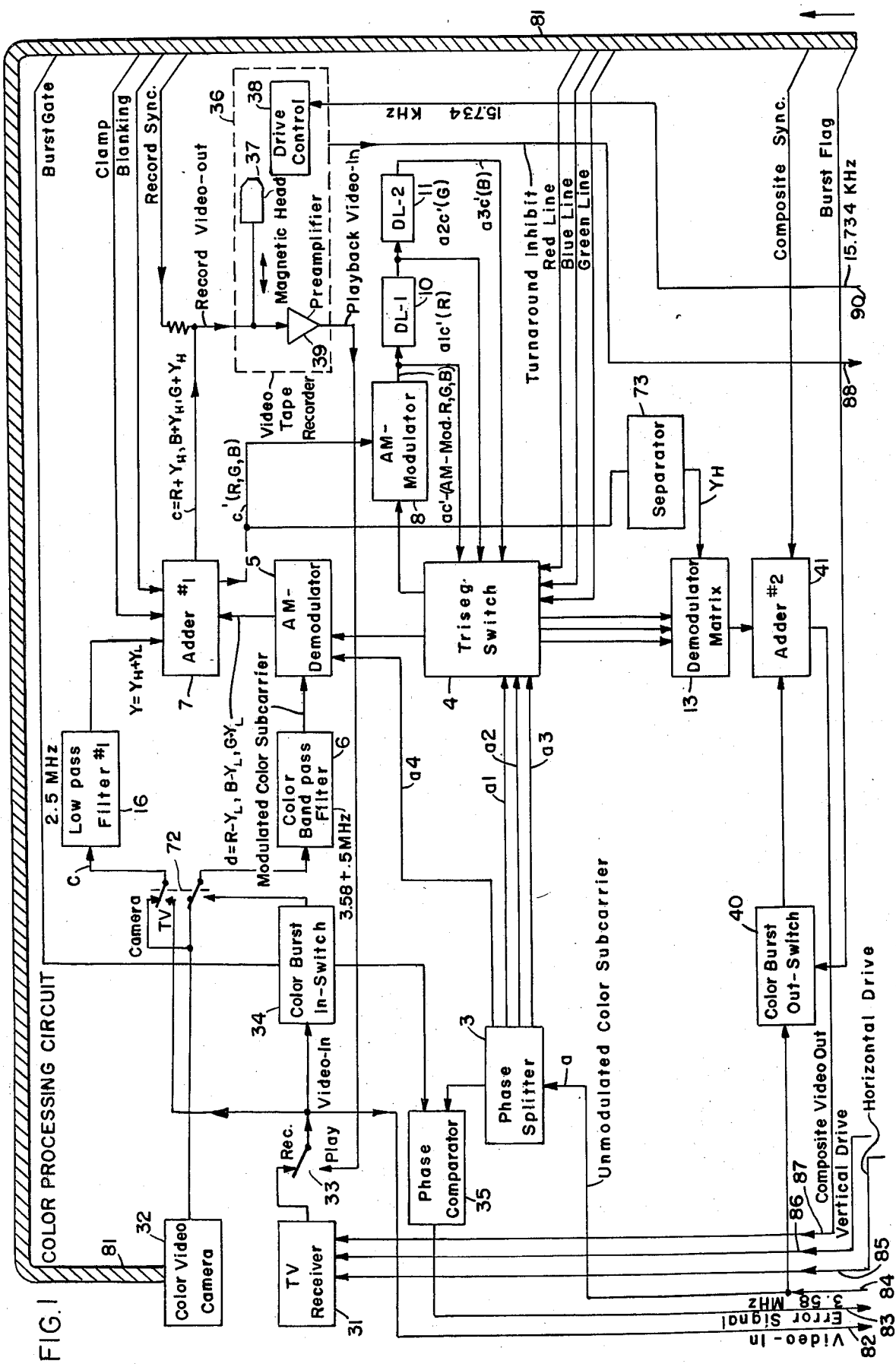
FIG. 1 shows a block diagram of the color processing circuit used in the system according to the invention.
Figure 2:
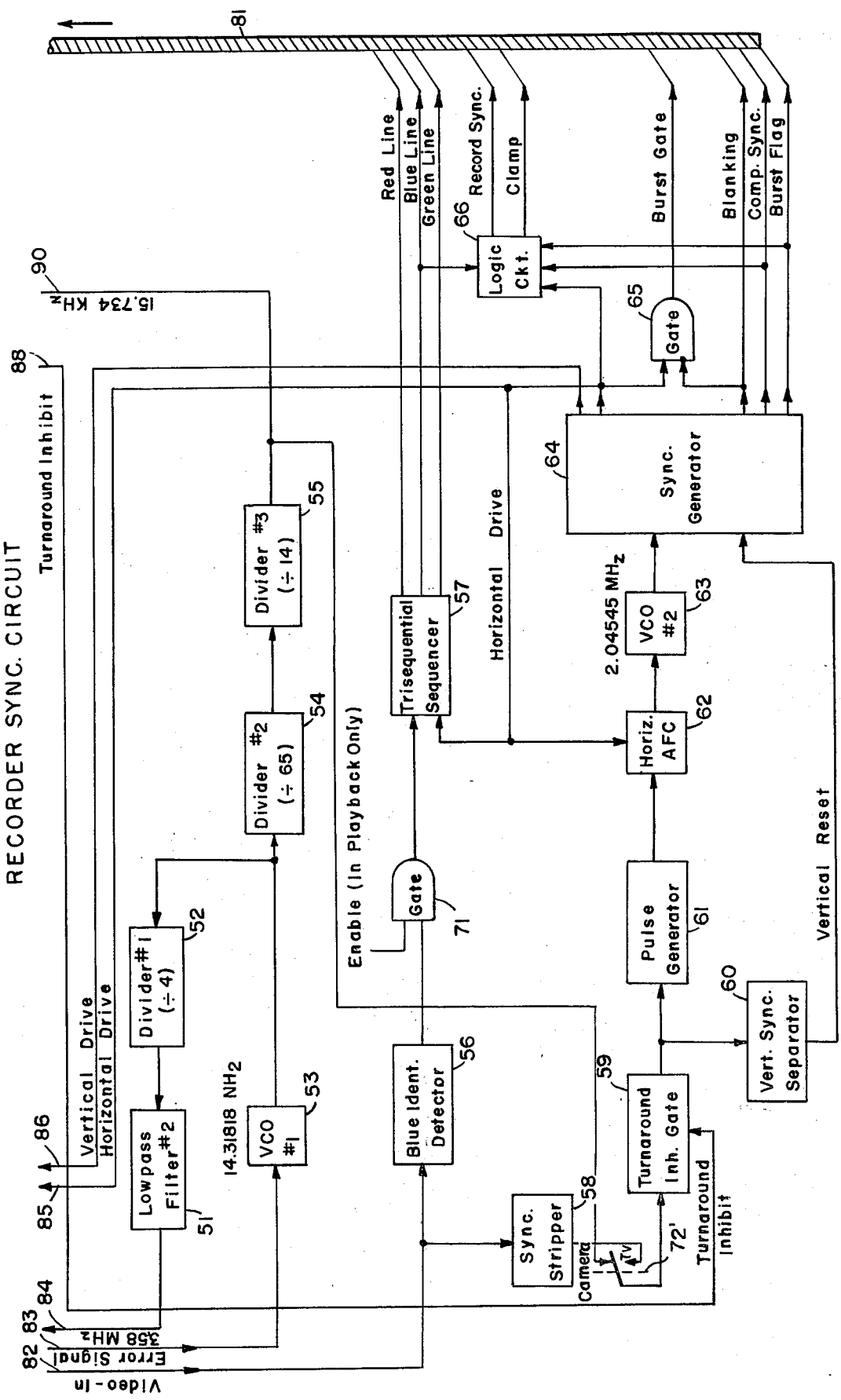
FIG. 2 illustrates a block diagram of the recorder synchronizing circuit proper.

Before explaining the detailed operation of the system, the apparatus used in the embodiment shown in block diagrams FIGS. 1 and 2 will be briefly described. At the outset it may be noted that while this embodiment relates to a system using NTSC (National Television Systems Committee) standards, the invention is equally applicable to a system using PAL (Phase Alternate Lines) standards.

As shown in FIG. 1, the system according to the present embodiment includes a TV receiver 31, a video tape recorder 36 and a color video camera 32. The video taper recorder of the illustrated embodiment is assumed to be of the "linear" or longitudinal type. Since video tape recorders of this kind are well-known in the art, the details of this unit have not been shown; however, magnetic head 37, pre-amplifier 39 and drive control 38 of the recorder have been indicated in schematic form. Moreover, reference is made to copending United States patent application S.N. 388,929, filed July 12, 1973, now U.S. Pat. No. 3,921,933 by G. Rotter, L. S. Bleininger and R. L. Gertz on a Tape Transport Mechanism. This co-pending application discloses and claims a tape transport for a linear tape recorder to which the present synchronizing system may well be applied.

The trisequential part of the color processing circuitry shown in FIG. 1 is of the structure disclosed in the above mentioned co-pending application Ser. No. 473,221, and in order to facilitate a comparison between the present disclosure and that shown in the copending application, corresponding reference numerals have been used in FIG. 1 for the components involved in the trisequential demodulation and modulation process. These components include low pass filter 16, color bandpass filter 6, AM demodulator 5, adder 7, trisequential switch 4, phase splitter 3, AM modulator 8, delay lines 10 and 11, and demodulator matrix 13.

To continue with the apparatus used in the color processing circuit, FIG. 1, 34 is a color burst in-switch which serves to separate the color burst from the incoming video signal and impress this burst on phase comparator 35. On the other hand reference 40 denotes a color burst out-switch which is used to impress the 3.58 MHz subcarrier frequency on adder 41. Switch 33 which is indicated here only in schematic form and may in practice be the transfer contact of a relay controlled, for example, by the various manual push buttons or the like of the tape recorder, serves to selectively switch the incoming video conductor from the video output of TV receiver 33 to the playback signal at the output of pre-amplifier 39. On the other hand switch 72, 72' serves to switch the circuit from the use of the camera to the use of the TV receiver as the incoming video source. The function of section 72 (FIG. 1) of this switch is to disable the color burst detection if the camera is used as the source for the recording since in that case oscillator 53 described below is to be free-running, the same as in playback. The function of section 72' (FIG. 2) of the switch is to insure that the second oscillator, 63 (introduced below), is locked to the incoming sync pulse only if the TV receiver is used as the source, but is locked to the 15.734 KHz line frequency from the first oscillator, only if the camera is used as the source.

Figure 3:
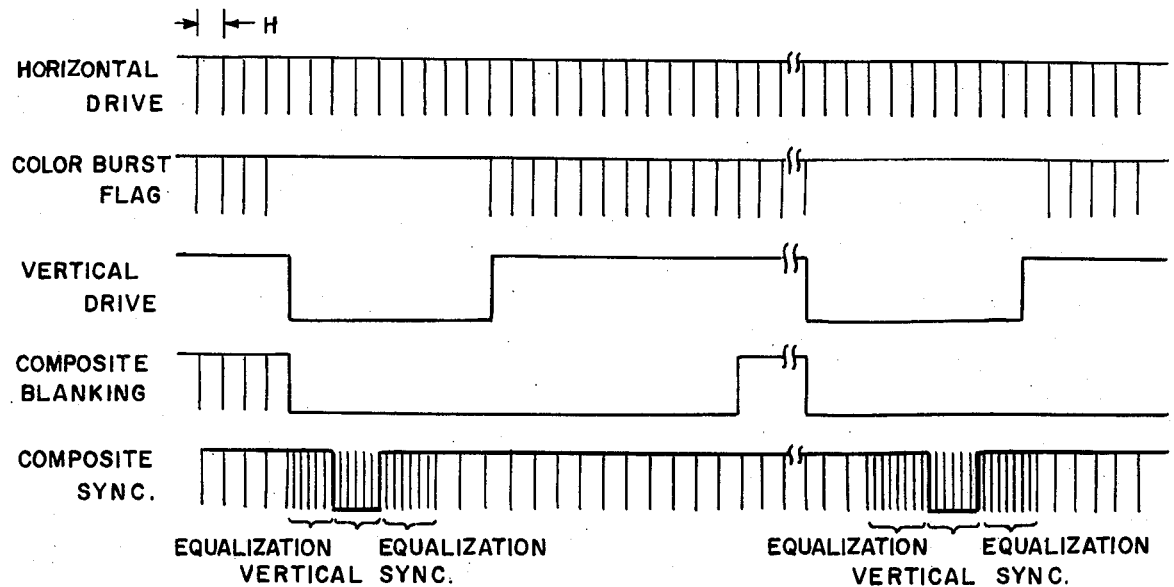
FIG. 3 is a chart showing the output wave forms of the sync generator.

It will be noted that certain of the components of the color processing circuit, FIG. 1, receive repetitive control pulses of various kinds over conductors included in cable 81 which has its origin in recorder sync circuit FIG. 2. Referring now particularly to FIG. 2 the heart of the recorder sync circuit on the one hand is voltage controlled oscillator or clock 53 which has a frequency of 14.31818 MHz and, on the other hand, voltage controlled oscillator 63 which has a frequency of 2.04545 MHz and drives sync generator 64. It may be of interest to note here that the repetition frequency 2.04545 MHz, is one-seventh of the frequency, 14,31818 MHz, of the first oscillator, 53, and is 130 times the line frequency (15.734 KHz). Furthermore, while the subcarrier frequency, for brevity's sake, has been referred to herein as 3.58 MHz, this frequency actually is 3.579545 MHz, which is one fourth of 14.31818 MHz; in short, the frequency of oscillator 53 has been chosen so that when divided by four it yields the subcarrier frequency and, by the same token, so that when divided by 65 × 14 − 910 it yields the line frequency. Sync generator 64 is of a commercially available design; for example, the MM 4320/MM 5320 TV Camera Sync Generator chip marketed by National Semiconductor Corporation, Santa Clara, California, may be used for this purpose. The output wave forms of this LSI chip are shown in FIG. 3 hereof. In the synchronization arrangement according to the present invention, other outputs shown in FIG. 2 are derived from this sync generator by means of gate 65 and logic circuit 66. Trisequential sequencer 57 which supplies the Red, Blue and Green Line pulses required for the sequential operation of trisequential switch 4, FIG. 1, is driven by the Horizontal Drive output of sync generator 64. Sequencer 57 has another input from blue identification detector 56 the input of which is connected to Video-In conductor 82. And gate 71 insures that the blue identification is effective to supply a synchronizing pulse to sequencer 57 in playback only. In recording, the sequencer, in the case of the NTSC system, is free-running, that is, it is merely under the control of the Horizontal Drive clock pulse. It may be added in passing that in the PAL system sequencer 57 is locked to the oddeven field sequence.

As will be seen from block diagrams FIGS. 1 and 2, oscillator 53 is included in a phase locked loop which extends from the output of this oscillator through divider 52 and low pass filter 51 by way of the 3.58 MHz output conductor of the last mentioned filter, phase splitter 3 connected to one input of phase comparator 35, and the error signal output of this phase comparator back to the input of VCO 53. In recording off-air, that is, from the TV receiver, phase comparator 35, as indicated above, receives a color burst input, through switch 34, from the incoming video signal and hence the above traced phase locked loop for VCO 53 is effective. Due to the fact that the off-tape signal received in playback from preamplifier 39 does not contain a color burst or, for that matter, any other color subcarrier information, the phase locked loop for VCO 53 is ineffective in playback, that is in this mode oscillator 53 is free-running. Oscillator 53 is also free-running in recording from the camera, namely because switch 72 is unoperated in that case.

As shown in FIG. 2, the output of VCO 53 is also connected through frequency dividers 54 and 55 in tandem to line frequency conductor 90 (15.734 KHz) to provide a motor or servo reference.

The second voltage controlled oscillator 63 is included in a phase locked loop extending from the Horizontal Drive output of sync generator 64 back to horizontal automatic frequency control circuit or phase comparator 62 the output of which is connected to the input of VCO 63. Horizontal AFC 62 has another input from pulse generator 61, which in off-air recording and also in playback, is connected to the output of sync stripper 58 through the medium of turnaround inhibit gate 59. The input of the sync stripper is connected to Video-In conductor 82 which, as indicated above, may be connected to the composite video output of TV receiver 31 or to the output of pre-amplifier 39, depending on whether switch 33 is in its record or playback position. In recording from the camera the input of gate 59 is connected to the line frequency through switch 72' in normal position.

FIG. 2 also shows a vertical sync separator 60 which has an input from turnaround inhibit gate 59. The Vertical Reset output of separator 60 is connected to another input of sync generator 64. This Vertical Reset control, in effect, serves to properly time the transfer in the sync generator as between the relatively high frequency vertical sync, that is, serration and equalization, pulses and the relatively low frequency horizontal sync pulses as contained in the Composite Sync pulse series, compare the bottom line of FIG. 3.

DESCRIPTION OF THE BASIC OPERATION OF THE SYSTEM

1. Trisequential Processing

Before describing the synchronizing functions of the embodiment illustrated in the drawings, it may be helpful first to summarize the more important features of the trisequential conversion and recombination technique used herein, reference again being made to copending application Ser. No. 437,221. Now U.S. Pat. No. 3,891,503 Briefly, in the trisequential technique shown, the color subcarrier of the color video signal is not recorded, with the ensuing advantage that simple home video recorders with their typically limited bandwidth may be used. Instead, the demodulation of the chroma signals into trisequential form and the recombination of the trisequential signals to produce the required NTSC (in the present embodiment) signals is brought about by the generation, by means of phase splitter 3, of a 3-phase color subcarrier which has the three phases $a_1, a_2, a_3$ of the received chroma signals; by switching in the recording mode, the three phases of the subcarrier by means of trisequential switch 4 line sequentially into AM synchronous demodulator 5, thereby to produce sequentially demodulated color difference signals d-$Y_L$, B-$Y_L$, G-$Y_L$; and by adding to the sequentially demodulated color difference signals, the luminance signal $Y=Y_H+Y_L$ to generate trisequential video signals, each consisting of one chroma signal and the high frequency luminance signal, $Y_H$ of each line scan, for eventual recording. The high-frequency luminance signal $Y_H$ is separated from the rest of the video signal by separator 73. As shown in FIG. 1, and as more particularly described in the copending application, another subcarrier, $a_4$, is supplied from phase splitter 3 to AM demodulator 5 for the correction of phase errors that would otherwise remain in the use of this technique. A typical circuit for a trisequential switch has been disclosed, for example, in German patent specification No. 1,290,578 issued Oct. 30, 1969.

During playback the recorded information, passed through lowpass filter 16 and subjected to clamping and blanking in adder 7, is recombined in AM modulator 8 with the corresponding three phases of the color subcarriers, these phases being line sequentially switched into modulator 8 by trisequential switch 4. In playback no color signals, of course, are passed from demodulator 5 to adder 7. The output of the modulator is then recombined by presenting this output through a set of delay lines 10 and 11, and by trisequentially switching the corresponding three signals a1c' (R), and a2c' (G) and a3c' (B) by means of trisequential switch 4 into output demodulator matrix 13, which at its output produces the video content of the NTSC signal.

2. Synchronization in Recording Off-Air

In recording from the TV reciever, i.e. with switch 33 in normal position and switch 72, 72' operated, the composite video output of TV receiver 31 is impressed, not only on lowpass filter 16 mentioned above but also on color burst in-switch 34, FIG. 1, and, by way of conductor 82, on sync stripper 58, FIG. 2. Color burst in-switch 34 is controlled in the proper time relationship by the Burst Gate pulse derived through gate 65 from sync generator 64, FIG. 2, reference being made in this connection to FIGS. 3 and 4 which show the waveforms involved in the isolating of the color burst. Phase comparator 35 compares the phase of the color burst from switch 34 with the phase of the 3.58 MHz unmodulated color subcarrier received from the output of the first VCO 53, through divider 52 and lowpass filter 51, FIG. 1. If the two phases deviate from each other, a DC error signal of one or the other polarity is developed by the phase comparator and this DC signal is impressed via conductor 83 on the input of VCO 53. The error signal may act, for example, on a FET, now shown, in VCO 53, this FET having a function corresponding to that of the well known "reactance tube" used in voltage control circuits of earlier vintage. It will be appreciated from the foregoing that oscillator VCO 53 in this fashion is phase locked to the color burst of the incoming video signal and that, for this reason, the line frequency which is impressed, by way of conductor 90, on drive control 38 of tape recorder 36, FIG. 1, is likewise locked to the color burst. As a result, the drive motor, not shown, of the tape recorder, which may, for example, be connected in a tachometer loop is locked in turn to the incoming color burst. In this connection reference is made to copending application Ser. No. 437,285, filed Jan. 28, 1974, by Gerhard Rotter, William A. Buchan and Rainer an der Heiden, on Arrangements for Time Base Error Compensation. It should be pointed out, however, that the time base error compensation arrangement disclosed in this last mentioned copending application, which uses a bucket brigade, need not necessarily be included in the present tape recorder system.

Figure 4:
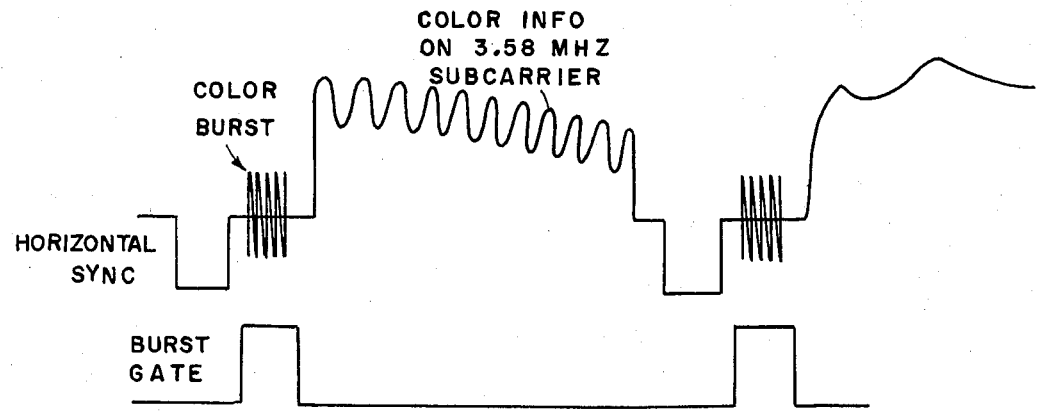
FIG. 4 is a chart showing the incoming composite video signal with its color information, its horizontal sync, and its color burst.

Reverting now to the second voltage controlled oscillator 63, it will be recalled that in off-air recording this VCO is controlled from the horizontal sync pulse which is separated from the incoming video signal by sync stripper 58, compare FIG. 4, and that the output of the sync stripper is supplied via turnaround inhibit gate 59 to pulse generator 61 which provides an input for horizontal AFC 62. As earlier indicated, since one of the outputs of sync generator 64 is the Horizontal Drive pulse series, VCO 63 is, in effect, included in a phase lock loop which follows the horizontal sync signal incoming from the TV receiver. It may be added that gate 54 is closed, under the control of the turnaround inhibit pulse forwarded by the electronic circuitry of the tape recorder to "freeze" the synchronization circuit during the turnaround interval in the state reached by the curcuit just prior to turnaround. The turnaround interval may be determined, for example, with the aid of the technique described and claimed in co-pending United States patent application S.N. 443,411, filed on Feb. 19, 1974, and now abandoned by G. Rotter and A. Aspe on a Turn Around Method and Circuit.

It will further be noted that logic circuit 66, FIG. 1, which has four inputs, viz. from the Horizontal Drive, the Composite sync and the Burst Flag outputs of sync generator 64, and from the Blue Line output of trisequential sequencer 57, respectively, supplies a Record Sync pulse and a Clamp pulse to the color processing circuit, FIG. 1, and that the sync generator directly transmits a Blanking pulse to FIG. 1, all by way of cable 81. In FIG. 1, the Clamp and Blanking pulses are supplied to the above mentioned adder 7 in which luminance signal Y from lowpass filter 16 and the color difference signals from AM demodulator 5 are summed to provide the trisequential video output $c=R+Y_H$, $B+Y_H$, $G+Y_H$ to magnetic head 37 for recording. The Blanking pulse has the function of blanking out the sync information in the incoming video signal and the Record Sync pulse is used to impress fresh sync information on the outgoing video signal. The Blue Line input to logic circuit 66 serves to generate an additional pulse which is placed on the back porch and functions to identify the blue phase, thereby to insure that the recorded information has the proper phase relationship. It will be appreciated that in this manner deficiencies in the incoming sync signal are kept from being passed to the magnetic head, but that on the contrary, the recording of clean and properly timed sync pulses on the tape is insured.

It will further be noted that trisequential sequencer 57 which is driven by the Horizontal Drive pulse generated by sync generator 64, supplies the Red Line, Blue Line, and Green Line pulses to trisequential switch 4, FIG. 1, thereby to control the commutator action, as it were, of this switch, both in the demodulation and the modulation process, in the correct time relationship to the incoming video signal.

3. Synchronization In Recording Off-Camera

The operation in making a recording with camera 32 as the video source is in most respects the same as that described under the preceding heading except that in this case—in which both switches 33 and 72, 72' are left in their normal position—no sync information may be received with the video signal. since the phase lock loop for the first oscillator accordingly is ineffective, this oscillator, 53, is free-running; and since no sync signal can be derived from sync stripper 58, the second oscillator 63, with switch 72' in its normal position, is driven from the line frequency output (15.734 KHz) provided by VCO 53 through dividers 54 and 55. Under the control of the clock pulses received from VCO 53 the sync generator, 64, now produces a sync pattern just as described, again providing a feedback loop by means of the Horizontal Drive pulse and controlling over the Record Sync conductor the impression on the Record Video-Out conductor, of the proper sync information for the video signal to be recorded. The Blanking input to adder 7 is ineffective in this case, assuming that the camera does not provide any sync information. If it does, this information will be wiped out by the Blanking pulse.

4. Synchronization in Playback Mode

The off-tape signal, as is well known, is subjected to variations in the tension of the video tape during recording and playback and to irregularities in the operation of the elements of the tape drive transport, for example. The synchronization circuit according to the invention results in a sync pattern which takes this "time base error" of the off-tape signal into consideration, namely by locking the second VCO, 63, to the horizontal sync pulse of the off-tape signal-substantially in the same manner as VCO 63 was locked to the off-air signal in the record mode. As a result, the sync pattern generated follows, as is required, the jitter content of the off-tape signal, or whatever is left of this jitter if time base error compensation is used, for example according to the teachings of the above mentioned copending application of Gerhard Rotter et al. However, although the first oscillator, 53, in the playback mode is free-running, the servo reference (15.734 KHZ) derived from the last mentioned oscillator is locked to the 3.58 MHz subcarrier also generated by this VCO and consequently the unmodulated color subcarrier is inserted in the off-tape video signal prior to display in the proper time relationship.

More particularly it will be noted from FIGS. 1 and 2 that the color burst out switch 40, which supplies the subcarrier to adder 41 under the control of the Burst Flag pulse, is actuated, due to the phase locking of VCO 63 and sync generator 64 to the off-tape horizontal sync. in the correct synchronous relationship to properly superimpose the subcarrier as a color burst on the back porch of the composite sync signal also supplied to adder 41 by means of the composite sync pulse. Also, the Red, Blue and Green Line pulses are supplied by trisequential sequencer 57, synchronized by blue identification detector 56 through enabling gate 71, to trisequential switch 4 in the proper phase relationships to permit the trisequential signals to be properly recombined with the aid of modulator 8, delay lines 10 and 11 and demodulator matrix 13. It should be noted that for playback switches 72 and 72', regardless of the source of the recording, are to be placed in their operated or "TV" position and that switch 33 is to be actuated, i.e. placed in the position marked "Play."

From the foregoing description it will be appreciated that a synchronizing arrangement for a home video recording system or, more broadly, a color video home entertainment system, has been created in which all required synchronizing functions, in recording as well as in playback, are generated, accurately and yet economically, by a single synchronizing circuit which may be associated with the recorder.

It should be understood that the foregoing description is not meant to limit the invention to the disclosed embodiments.

We claim:

1. A synchronizing arrangement for use in a color video recorder system comprising:
   apparatus for providing an incoming composite video signal,
   means for separating the color burst from said incoming video signal,
   a first oscillator,
   means for deriving from said first oscillator an unmodulated color subcarrier,
   a phase-locked loop for said first oscillator, said loop being effective in the recording mode and including means for comparing the phase of said unmodulated color subcarrier with the phase of said separator color burst,
   means for deriving from said first oscillator a motor reference for said recorder, whereby said motor reference is locked to said color burst,
   a second oscillator,
   a sync generator driven by said second oscillator and developing a sync pattern comprising a plurality of different series of repetitive pulses,
   means for separating the horizontal sync signal from said incoming video signal,
   a phase-locked loop for said second oscillator, said loop including means for comparing the phase of one of said pulse series with the phase of said separated sync signal, and
   apparatus for processing said video signal prior to recording, said apparatus including means controlled by others of said pulse series for impressing regenerated sync information on the video signal to be recorded.

2. A synchronizing arrangement as claimed in claim 1, wherein said means for deriving said color subcarrier and said means for deriving said motor reference include first and second frequency dividing means, respectively.

3. A synchronizing arrangement as claimed in claim 1, wherein said pulse series is a series of horizontal drive pulses and wherein there is interposed between said horizontal sync signal separating means and said second oscillator a horizontal automatic frequency control circuit and a pulse generator driving said automatic frequency control circuit, said frequency control circuit being also controlled by said generator.

4. A synchronizing arrangement as claimed in claim 1, wherein there is interposed between said horizontal sync signal separating means and said second oscillator a turnaround inhibit gate controlled by said recorder.

5. A synchronizing arrangement as claimed in claim 1, wherein said processing apparatus comprises means, including a trisequential switch, for converting said incoming video signal into trisequential form, and wherein there are provided trisequential sequencing means driven by said sync generator for providing said trisequential switch with series of trisequential driving pulses, each said series corresponding to one of said colors.

6. A synchronizing arrangement as claimed in claim 5, wherein said means for impressing regenerated sync information on the incoming video signal to be recorded includes logic circuitry controlled by predetermined ones of said repetitive pulse series for providing an additional series of synchronizing pulses placed on the back porch for identifying one of said series of trisequential driving pulses.

7. A synchronizing arrangement as claimed in claim 1, wherein said system, in addition to the recorder, also includes a color video camera and wherein circuit connections are interposed between said sync generator and said camera for also driving and synchronizing said camera in accordance with the sync pattern provided by said sync generator.

8. A synchronizing arrangement for use with a linear video tape recorder, said recorder providing a subcarrier-free off-tape video signal in playback, said arrangement comprising:
a first oscillator,
means for deriving from said first oscillator an unmodulated color subcarrier,
a second oscillator,
a sync generator driven by said second oscillator and developing a sync pattern comprising a plurality of different series of repetitive pulses,
means for separating the horizontal sync signal from said off-tape video signal,
a phase locked loop for said second oscillator, said loop including means for comparing the phase of one of said pulse series with the phase of said separated sync signal, and
means for processing said off-tape video signal prior to display, said apparatus including means controlled by one of said pulse series for reinserting said unmodulated color subcarrier in the video signal to be displayed.

9. A synchronizing arrangement as claimed in claim 8, and further comprising means for deriving from said first oscillator a servo reference, whereby said servo reference and said unmodulated subcarrier are locked together.

10. A synchronizing arrangement as claimed in claim 8, wherein said off-tape signal is a trisequential signal, wherein said processing apparatus comprises means, including a trisequential switch, for converting said off-tape signal from trisequential form into parallel form, and wherein there are provided trisequential sequencing means driven by said sync generator for providing said trisequential switch with series of trisequential driving pulses, each said series corresponding to one of the colors.

11. A synchronizing system for use with a linear video tape recorder comprising:
apparatus for providing an incoming video signal in the recording mode,
means for separating the color burst from said incoming video signal,
means for providing a subcarrier-free off-tape video signal in the playback mode,
a first oscillator,
means for developing from said first oscillator an unmodulated color subcarrier,
a phase locked loop for said first oscillator, said loop being effective in the recording mode and including means for comparing the phase of said unmodulated color subcarrier with the phase of said separated color burst, and said first oscillator being free-running in the playback mode,
a second oscillator,
a sync generator driven by said second oscillator and developing a sync pattern comprising a plurality of different series of repetitive pulses,
means for separating the horizontal sync signal from the video signal both in the recording mode and the playback mode,
a phase locked loop for said second oscillator, said loop including means for comparing the phase of one of said pulse series with the phase of said separated sync signal,
first apparatus for processing said incoming video signal prior to recording, said apparatus including means controlled by others of said pulse series for impressing regenerated sync information on the video signal to be recorded, and
second apparatus for processing said off-tape video signal prior to display, said second appartus including means controlled by yet another of said pulse series for reinserting said unmodulated subcarrier in the video signal to be displayed.

12. A synchronizing arrangement for use in a color video recorder system, comprising:
apparatus for providing an incoming composite video signal,
means for separating the color burst from said incoming video signal,
a first oscillator, means for deriving from said oscillator an unmodulated color subcarrier, said oscillator being phase locked, in recording, to said separated color burst through the medium of said subcarrier,
means for deriving from said first oscillator a motor reference for said recorder, whereby said motor reference is locked to said color burst,
a sync generator developing a sync pattern comprising a plurality of different series of repetitive pulses,
means for separating the horizontal sync signal from said incoming video signal,
a second oscillator driving said sync generator and being phase locked to said separated sync signal through the medium of one of said pulse series, and
apparatus for processing said video signal prior to recording, said apparatus including means controlled by others of said pulse series for impressing regenerated information on the video signal to be recorded.

* * * * *